(12) United States Patent
Lin et al.

(10) Patent No.: US 7,106,731 B1
(45) Date of Patent: *Sep. 12, 2006

(54) ROUTER WITH CLASS OF SERVICE MAPPING

(75) Inventors: Arthur Lin, San Ramon, CA (US); Thomas J. Edsall, Mountain View, CA (US); Tauseef Hashmi, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 09/616,842

(22) Filed: Jul. 14, 2000

Related U.S. Application Data

(63) Continuation of application No. 09/001,478, filed on Dec. 31, 1997, now Pat. No. 6,463,068.

(51) Int. Cl.
*H04L 12/56* (2006.01)
(52) U.S. Cl. .................................. 370/389; 370/395.21
(58) Field of Classification Search ...................... None
See application file for complete search history.

(56) References Cited

U.S. PATENT DOCUMENTS

| | | |
|---|---|---|
| 5,764,641 A | 6/1998 | Lin et al. |
| 5,953,341 A | 9/1999 | Yamanaka et al. |
| 6,463,068 B1 | 10/2002 | Lin et al. |

OTHER PUBLICATIONS

Floyd, S. and Jacobson, V., "Random Early Detection Gateways for Congestion Avoidance", Aug. 1993 IEEE/ACM Transactions on Networking, pp. 1-32.

*Primary Examiner*—Huy D. Vu
*Assistant Examiner*—Toan Nguyen
(74) *Attorney, Agent, or Firm*—Cesari and McKenna LLP

(57) ABSTRACT

A router classifies packets assigned to X*Y classes of service into X classes of service supported by the router, each of the X classes of service having Y loss-priority levels. The router maintains a free queue that links available entries of a buffer in which packets are stored. A weighted average depth of the free queue is used to determine whether to retain a given packet. If the weighted average is above a maximum threshold, the packet is retained. If the weighted average is below a minimum threshold, the packet is discarded. If the weighted average is between the two thresholds, a probability of discard that is based on the X*Y classes of service is calculated and compared to a random value to determine whether the packet should be retained.

38 Claims, 5 Drawing Sheets

| CLASSES OF SERVICE | COS TAGS | CLASS OF SERVICE PER OUTPUT PORT QUEUES |
|---|---|---|
| IS/ISSLL GUARANTEED | 000/001 | $Q_0$ |
| ROVING MANAGEMENT | 000/001 | $Q_0$ |
| IS/ISSLL CONTROLLED LOAD | 010/011 | $Q_1$ |
| RESERVED | 100/101 | $Q_2$ |
| BEST EFFORT | 110/111 | $Q_3$ |

FIG. 3

ROUTER WITH CLASS OF SERVICE MAPPING

RELATED APPLICATIONS

This application is a continuation of U.S. patent application Ser. No. 09/001,478, which was filed on Dec. 31, 1997, and issued on Oct. 8, 2002 as U.S. Pat. No. 6,463,068, entitled Router with Class of Service Mapping, by Lin et al.

FIELD OF INVENTION

The invention relates generally to routers and switches and, more particularly, to routers and switches that support multiple classes of service for packet routing.

BACKGROUND OF THE INVENTION

At network multiplexing points, such as switches or routers, the handling of frames or packets is generally determined by rules associated with classes of service to which given frames or packets are assigned. The classes of service essentially define acceptable packet or frame delays and probabilities of packet or frame loss. (As used herein, the term "packet" refers to both frames and packets, and the term "router" refers to both switches and routers.)

The packets are typically assigned to classes of service based on information contained in the packet and/or traffic management rules established by either a network supervisor or a service provider. All packets assigned to the same class receive the same treatment. Being assigned to a "higher" class ensures that a packet will have a shorter maximum transmission delay and a lower probability of loss. Being assigned to a "lower" class may mean a longer delay and/or a greater probability of loss.

Generally, the router maintains at each output port a buffer for holding packets in queues associated with the classes of service. The queues ensure that packets are delivered in order within the various classes of service, and that the associated rules for maximum delays and probabilities of loss can be enforced. Since each queue is essentially separately maintained, the more classes the router supports the more processing and storage capacity is required for a given number of output ports. To support "x" classes, for example, the router must set aside buffer storage locations for each of the x queues at each of its "y" ports. Further, it must determine for each queue whether or not a next packet should be retained or discarded. The router thus makes x*y separate calculations based on queue length and/or available associated storage locations to determine whether to retain or discard the packets, where "*" represents multiplication.

Network standards, such as the (revised) 802.1p standard, have relatively recently increased the number of classes of service to eight classes. Routers operating under prior standards support four classes of service, and thus, must be upgraded, for example, with increased storage capacities of the output port buffers, to support the increased number of classes. Such upgrading may be prohibitively expensive and/or it may not be feasible. Accordingly, what is needed is a mechanism to operate a router that supports a relatively small number of classes of service in an environment in which packets are assigned to a greater number of classes. Such a mechanism should, without requiring the enlarged storage and processing capabilities conventionally associated with supporting the greater number of classes, maintain service distinctions associated with the greater number of classes and more importantly retain the order of packets within each of the greater number of classes.

SUMMARY OF THE INVENTION

A router maps packets assigned to $2^{n+m}$ classes of service into $2^n$ classes of service and assigns the packets to $2^m$ levels of loss-priority within each of the $2^n$ classes. The router includes a classifier that uses n bits of an (n+m)-bit "class of service identifier" to map the packets to the $2^n$ classes, and the remaining m bits to assign the loss priorities. The router then controls packet retention/discard with a modified weighted random early detection scheme based in part on the $2^{n+m}$ classes and in part on the $2^n$ classes, to maintain the probability of loss distinctions and in-order packet handling associated with the $2^{n+m}$ classes.

A scheduler controls the transmission of packets by each output port based on the $2^n$ classes of service. The scheduler uses a weighted round robin scheme to ensure that packets from each of the classes are transmitted by each of the output ports within the prescribed maximum delay limits associated with the $2^{n+m}$ classes of service.

The router includes an output buffer that holds the packets for all of the router's output ports. The router maintains a "free queue," which links the buffer storage locations available for packet storage. To determine whether to retain or discard a given packet, the router compares a weighted average depth of the free queue with predetermined maximum and minimum thresholds that are associated with the particular one of the $2^{n+m}$ classes of service to which the packet is assigned. If the weighted average exceeds the associated maximum threshold, the router retains the packet in a storage location that is then removed from the free queue and linked to a class of service per output port queue that corresponds to the class of service to which the packet is mapped by the classifier. If the weighted average depth falls below the associated minimum threshold, the router discards the packet. If the weighted average depth falls between the associated minimum and maximum thresholds, the router calculates a probability of discard and compares the probability to a "random" value. The router discards the packet if the probability exceeds the random value, and otherwise retains the packet.

The maximum and minimum thresholds are set relative to one another such that the loss priorities associated with the $2^{n+m}$ classes are maintained. As discussed below, the router makes only one weighted average queue depth calculation for the free queue, and uses this calculation to determine whether to retain or discard packets for the $2^n$ classes of service. This is in contrast to prior known routers that must maintain at each output port separate average queue depths for each of the class of service per port queues.

BRIEF DESCRIPTION OF THE DRAWINGS

The invention description below refers to the accompanying drawings, of which:

FIG. 3 illustrates a mapping of packets to classes of service;

DETAILED DESCRIPTION OF AN ILLUSTRATIVE EMBODIMENT

Figure 1:
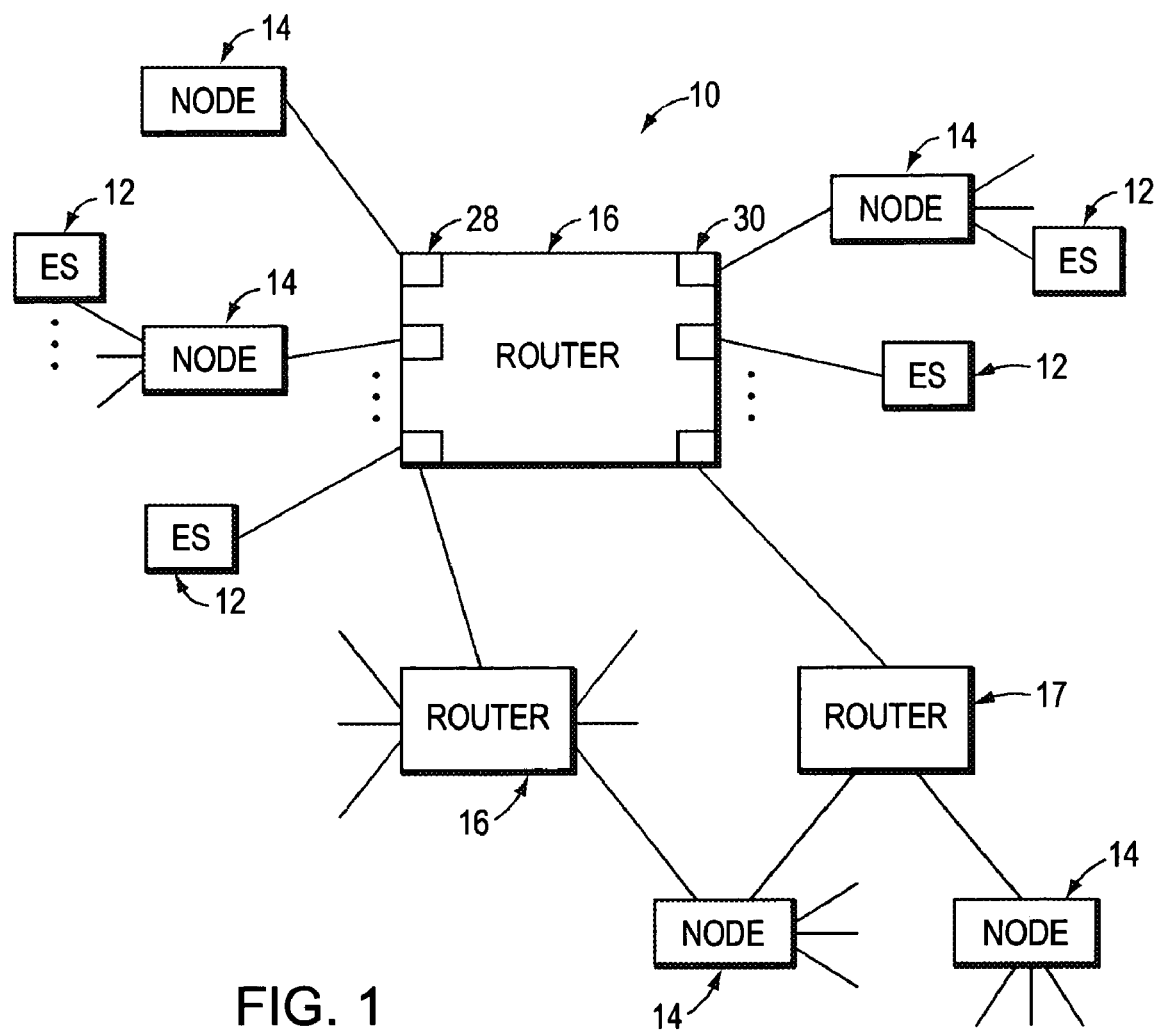
FIG. 1 is a functional block diagram of a network that includes routers that are constructed and operate in accordance with the invention.

Referring now to FIG. 1, a network 10 includes a plurality of endstations 12 and nodes 14 that transmit packets to other endstations 12 and nodes 14 through routers 16 and 17. The endstations 12 and nodes 14 assign packets to classes of service based on information contained in the packets and/or on predetermined traffic management rules that are provided by the network manager and/or various service providers. The classes of service are essentially associated with maximum limits for transmission delays and probabilities of packet loss. Higher classes are associated with shorter maximum delays and lower probabilities of packet loss. Packets that must be delivered as essential parts of a transmission are, for example, assigned to a higher class then are packets that contain non-essential information.

Preferably, the endstation 12 or the node 14 that introduces the packet to the network assigns the packet to one of $2^{n+m}$ classes of service. To inform the routers 16 and 17 of the assignment, the endstation 12 or node 14 writes an appropriate class of service "tag" to a COS identifier field in the header that is included in the packet. The COS identifier field has three bits, as defined by (revised) standard 802.1p, and the packet is thus assigned to one of eight classes of service, i.e., 1 of $2^3$ classes. The packet is then forwarded by the endstation 12 or node 14 over the network 10 to an input port 28 of a router 16 or 17. The router then transfers the packet through an output port 30 and over the network in accordance with the transmission rules and delay limits associated with the class of service to which the packet is assigned.

The routers 17 support $2^{n+m}$ classes of service while the routers 16 support $2^n$ classes, where n<3. We discuss herein the operations of the routers 16 to assign packets to the various classes. Further, we discuss the operations that the routers 16 and/or the routers 17 perform to determine whether to retain or discard a packet and/or when to transmit a packet.

Figure 2:
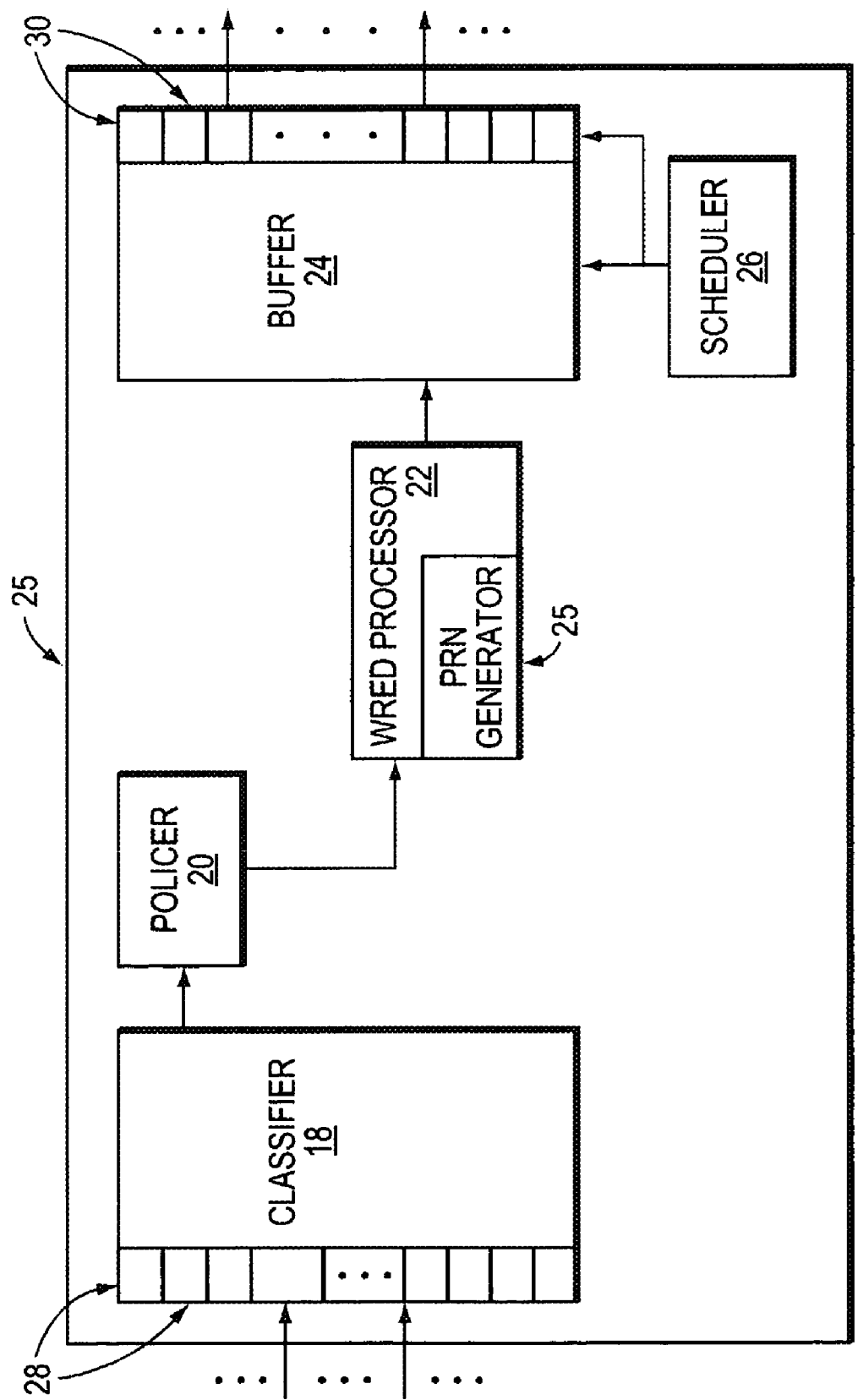
FIG. 2 is a functional block diagram of a router of FIG. 1.

Referring now to FIG. 2, a router 16 includes a classifier 18 that associates a received packet with one of $2^{n+m}$ classes of service, based primarily on the COS tag, if any, included in the packet header. The classifier maps the $2^{n+m}$ classes of service to the $2^n$ classes based on, for example, the highest order n bits or the lowest order n bits of the COS tag. The classifier then uses the remaining bits of the COS tag to set the loss priorities of the packets. As discussed below, the loss priorities determine if respective packets are discarded or retained during times of congestion. The higher the loss priority of a packet, the less likely the packet will be retained.

If the endstation 12 or node 14 that introduces the packet to the network does not support the 802.1p standard, the COS tag may not be included in the packet. The classifier 18 may then assign the packet to one of the $2^{n+m}$ classes, currently $2^3$ classes, based on appropriate network or service provider transmission rules. It may, for example, assign the packet to a "best effort" class. Alternatively, the router 16 may assign the packet to a particular class of service based on a media access control, or MAC, address included in the packet. The classifier then writes the appropriate COS tag to the packet header.

Referring now also to FIG. 3, the router 16 in this exemplary embodiment supports four classes of service, i.e., $2^2$ classes. The classifier 18 maps each of the $2^3$ classes of service to an appropriate one of the $2^2$ classes of service based on the two highest order bits of the 3-bit COS tag. The third, or lowest order bit, is then used to assign a loss priority to the packet. The classifier 18 thus associates a packet that is assigned to class of service 010 with class of service 01 and sets the loss priority of the packet to 0. Further, the classifier 18 associates a packet that is assigned to class of service 011 with class 01 and sets the loss priority of this packet to 1.

Figure 4:
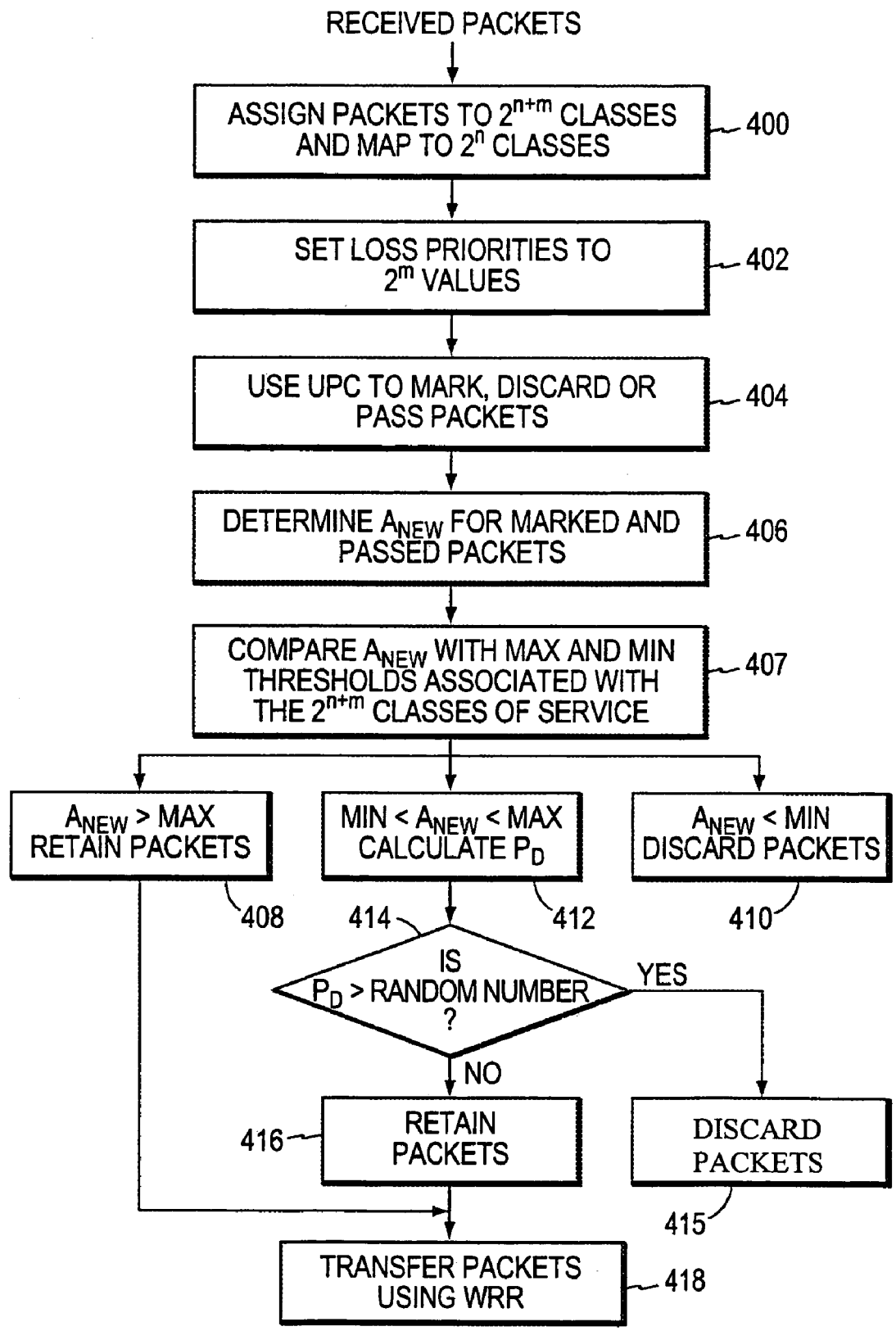
FIG. 4 is a flow chart of the operations of the router of FIG. 2.

Referring further to FIG. 4 once the classifier 18 associates the packets with the various $2^n$ classes of service and sets the loss priorities (steps 400–402), a policer 20 enforces network or service provider usage parameter controls by marking, discarding or passing the packets (step 404). The usage parameter controls are set by a network manager or service provider based on, for example, levels of service purchased by or associated with a user. The user may, for example, purchase a level of service based on the transmission of a maximum number of packets per hour. If the number of packets being sent by the user exceeds this limit, the policer then marks, discards or passes the excess packets depending on the traffic management rules.

If the policer 20 marks an offending packet, it assigns the packet to a higher loss priority within the associated class of service. This increases the likelihood that the packet will be discarded if the network becomes congested. In the example, the policer sets the lowest order bit of the COS tag to 1. If the packet is already assigned the highest loss priority within the class of service, the policer 20 either passes or discards the packet, depending on the traffic management rules. If the packet is passed, the policer 20 may charge the user for the use of excess bandwidth.

As discussed above, the policer 20 operates in accordance with traffic management rules established by a network manager or service provider. In the embodiment described herein the policer determines if a packet exceeds an established limit by using a "jumping window policing scheme." The policer thus sets a police rate of B/T for a user, where B is a burst size and T is a time interval and both B and T are set by the network manager or service provider. The policer then counts the number of octets received from the user over intervals of length T. If the count exceeds B, the arriving packet is marked, passed or dropped, depending on the enforcement mode utilized by the policer. Various limits may be set, such as, for example, limits that vary based on the number of times the associated policing rate is exceeded by a given user and/or based on the various classes of service.

A WRED processor 22 determines which of the remaining packets, i.e., the packets that the policer has not discarded, are to be retained in a buffer 24 that holds the packets for every output port 30 (steps 406–416). The use of a single buffer is in contrast to prior known routers that use a separate buffer for each output port.

The WRED processor 22 utilizes a modified weighted-random early detection (WRED) scheme. The WRED processor associates with each of the $2^{n+m}$ classes of service, "$C_i$," two thresholds, namely, a maximum threshold $MAX_{C_i}$ and a minimum threshold $MIN_{C_i}$. As discussed below, the thresholds are used by the processor 22 to determine whether to retain or discard a given packet.

The WRED processor 22 keeps track of an average "free queue" depth, which is an average number of available storage locations in the buffer 24. When the buffer is empty, all of the buffer storage locations are linked to the free queue. As packets are retained, buffer locations, which are generally referred to in 512 byte pages, are removed from the free queue and linked to appropriate class of service per output port queues. When the packets are later transmitted, the buffer locations are removed from the class of service per output port queues and again linked to the free queue.

Each time a packet is received, the WRED processor 22 determines a new weighted average free queue depth $A_{NEW}$:

$$A_{NEW} = A_{CURRENT} + W(I - A_{CURRENT})$$

where I is the instantaneous size of the free queue, W is the weighting factor and $A_{CURRENT}$ is the current weighted average free queue depth (step 406). The weighting factor W is preferably selected such that multiplication is accomplished by shifting the difference value $(I - A_{CURRENT})$. The value $A_{CURRENT}$ is updated at regular intervals with the value of $A_{NEW}$, such as after every 64B frame time, which approximates the average packet arrival time.

Figure 5:
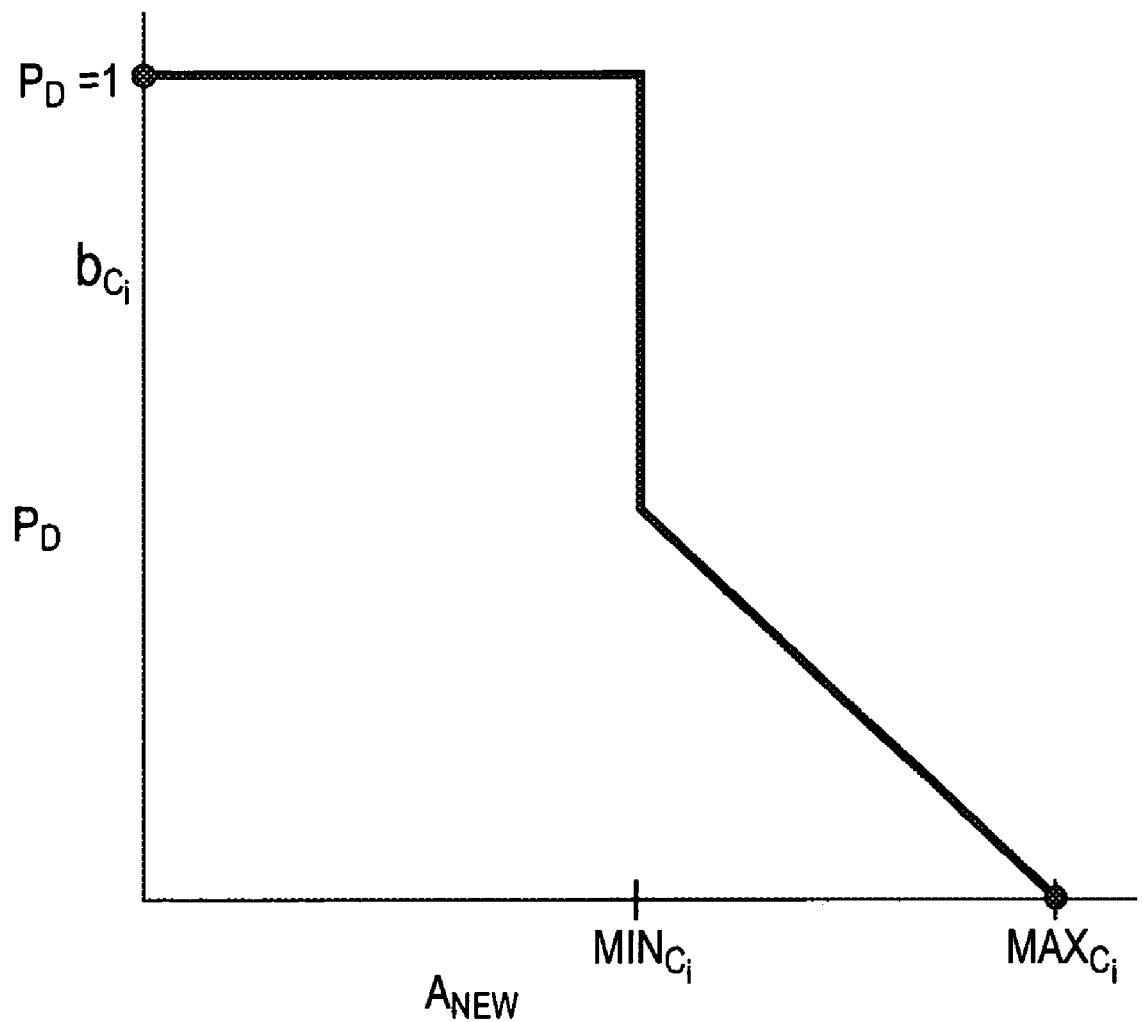
FIG. 5 is a graph of weighted average queue depth versus probability of packet discard.

The WRED processor compares the weighted average $A_{NEW}$ with the $MAX_{c_i}$ and $MIN_{c_i}$ values associated with the appropriate one of the $2^{n+m}$ classes of service. If the weighted average exceeds the $MAX_{c_i}$ value, the WRED processor 22 retains the packet (step 408). If the weighted average falls below the $MIN_{c_i}$ value, the WRED processor 22 discards the packet (step 410). If, however, the average falls between $MAX_{c_i}$ and $MIN_{c_i}$ values, the WRED processor calculates a probability of discard, $P_D$:

$$P_D = b_{c_i} - (m_{c_i} * A_{NEW})$$

Where $b_{c_i}$ and $m_{c_i}$ are the intercept and slope values associated with the appropriate one of the $2^{n+m}$ classes of service (step 412). As shown in FIG. 5, the probability of discard changes linearly with changes in the weighted average queue depth. A given packet is discarded when the probability of discard $P_D$ exceeds a "random" number that is produced by a pseudo random generator 25 (steps 414–416). When the weighted average is relatively low, the probability of discard is larger, and thus, the packet is more likely to be discarded.

The slope and intercept values $m_{c_i}$ and $b_{c_i}$ are selected based on trade-offs between keeping links through the router 16 busy and reserving space in the buffer 24 to handle bursts. For higher classes of service the slope and intercept values are selected to be relatively low—such that the probability of discard is low over the entire range from $MAX_{c_i}$ to $MIN_{c_i}$. The slope and intercept values for the lower classes of service are typically larger, reflecting the greater associated probability of packet loss for the class and the reservation of spaces in the buffer for bursts of packets assigned to the higher classes. The various threshold values, and slope and intercept values are selected such that packet order and probabilities of packet loss are maintained across the $2^{n+m}$ classes of service.

In prior known routers, implementing a WRED scheme required maintaining average queue depths for all of the classes of service queues at each of the output ports. Thus, for a router to support 8 classes of service over "y" output ports, it had to calculate average queue depths for 8*y separate queues. In the current router 16, the WRED processor calculates the average depth of a single free queue, regardless of the number of classes of service.

A scheduler 26 implements a $2^n$ class-based weighted round robin (WRR) scheduling scheme for each output port (step 418). The scheduler associates an appropriate weighting factor $W_{Q_i}$ with each class of service per output port queue. The scheduler de-queues $W_{Q_j}$ packets for transfer from the $Q_j$ queue associated with one of the $2^n$ classes of service, and then de-queues $W_{Q_{j+1}}$ packets from the $Q_{j+1}$ queue for subsequent transfer. If the $Q_{j+1}$ queue is empty, the scheduler de-queues an appropriate number of packets from the $Q_{j+2}$ queue, and so forth. The scheduler 26 thus ensures that each one of the $2^n$ classes of service is associated with an appropriate maximum delay limit and through-put allocation.

The class of service mapping, modified WRED scheme and WRR scheme in combination ensure that packets are transferred through the router 16 as if the router supported the $2^{n+m}$ classes of service. The router 16, however, requires less processing and storage overhead than the prior known routers that support the same number of classes, since the router 16 actually supports $2^n$ classes of service, and uses a single output buffer to do so.

What is claimed is:

1. A router for use in routing packets over a network, the router supporting a plurality, X, of classes of service and including:
   A. a plurality of input ports configured to receive packets over the network;
   B. a plurality of output ports configured to transfer packets over the network;
   C. a classifier configured to assign packets received by the input ports to X*Y classes of service, where * represents multiplication, and mapping the X*Y classes of service to the X classes of service that are supported by the router, the classifier assigning to the packet one of Y associated levels of priority, wherein each level of priority is associated with a different probability of packet loss;
   D. a buffer subsystem configured to retain the packets in class of service per output port queues based on probabilities of discard associated with the X*Y classes of service; and
   E. a scheduler for transferring the packets from the buffer subsystem through each of the output ports based on the X classes of service.

2. The router of claim 1 wherein the buffer subsystem includes multiple storage locations and links available storage locations in a free queue.

3. The router of claim 2 wherein the buffer subsystem includes a processor that determines:
   i. a new weighted average depth for the free queue, and
   ii. a probability of discard for a given packet if the new weighted average queue depth falls below a predetermined maximum threshold associated with the class of service to which the packet is assigned by the classifier.

4. The router of claim 3 wherein the buffer subsystem discards a given packet if the associated new weighted average depth for the free queue falls below a minimum threshold associated with the class of service to which the packet is assigned.

5. The router of claim 4 wherein the buffer subsystem processor calculates the probability of discard as $P_d = c - (m * A_{NEW})$ where c is an intercept and m is a slope that is associated with a line that plots average free queue depth versus probability of discard for the class of service to which the packet is assigned, and $A_{NEW}$ is the new weighted average depth of the free queue.

6. The router of claim 5 wherein the buffer subsystem processor calculates the new weighted average depth of the free queue as $A_{NEW} = A_{CURRENT} + w(I - A_{CURRENT})$ where w is a weighting factor, I represents the instantaneous depth of the free queue and $A_{CURRENT}$ is the current weighted average depth of the free queue.

7. The router of claim 1 wherein the scheduler selects from the buffer subsystem packets for transfer based on weighting factors associated with the respective X classes of service.

8. A router for use in routing packets over a network, the router supporting a plurality, X, of classes of service and including:
A. a plurality of input ports configured to receive packets over the network;
B. a plurality of output ports configured to transfer packets over the network;
C. a multiple storage location buffer configured to retain packets to be transferred through the output ports;
D. a buffer subsystem configured to retain the packets in class of service per output port queues based on probabilities of discard associated with X*Y classes of service, where Y represents a number and * represents multiplication; and
E. a scheduler configured to transfer the packets from the buffer subsystem through each of the output ports based on the X classes of service that the router supports.

9. The router of claim 8 further including a classifiers configured to:
i. assign packets received by the input ports to X*Y classes of service,
ii. associate the packets with the X classes of service that are supported by the router, and
iii. assign to the packet one of Y associated levels of priority, wherein each level of priority is associated with a different probability of packet loss.

10. The router of claim 8 wherein the buffer subsystem includes a processor that determines
i. a new weighted average queue depth for a free queue that links available buffer storage locations, and
ii. a probability of discard for a given packet if the new weighted average free queue depth falls below a predetermined maximum threshold associated with the class of service to which the packet is assigned.

11. The router of claim 10 wherein the buffer subsystem processor calculates the probability of discard as $P_d = c - (m*A_{NEW})$ where c is an intercept and m is a slope that are associated with a line that plots average free queue depth versus probability of discard for the class of service to which the packet is assigned, and $A_{NEW}$ is the new weighted average depth of the free queue.

12. The router of claim 11 wherein the buffer subsystem processor calculates the new depth of the weighted average free queue as $A_{NEW} = A_{CURRENT} + w(I - A_{CURRENT})$ where w is a weighting factor, I represents the instantaneous depth of the free queue and $A_{CURRENT}$ is the current weighted average depth of the free queue.

13. The router of claim 11 wherein the buffer subsystem discards a given packet if the new weighted average free queue depth falls below a minimum threshold associated with the class of service to which the packet is assigned.

14. The router of claim 11 wherein the buffer subsystem retains a given packet if the new weighted average free queue depth is above a maximum threshold associated with the class of service to which the packet is assigned.

15. The router of claim 8 wherein the scheduler selects packets for transfer through each of the output ports on weighting factors associated with the respective X classes of service.

16. An apparatus for routing packets through a router that supports a plurality, X, of classes of service, the apparatus comprising:
means for receiving packets;
means for assigning the packets to X*Y classes of service, where Y represents a number and * represents multiplication;
means for retaining packets based on probabilities of discard associated with the X*Y classes of service; and
means for transferring the packets based on the X classes of service.

17. The apparatus of claim 16, further including:
means for associating packets assigned to the X*Y classes of service with the X classes of service supported by the apparatus; and
means for assigning to the respective packets one of Y associated levels of priority, each level of priority being associated with a different probability of packet loss.

18. The apparatus of claim 17, further comprising:
means for determining a new weighted average depth for the free queue; and
means for determining a probability of discard for a given packet if the new weighted average free queue depth falls below a predetermined maximum threshold associated with the class of service to which the packet is assigned.

19. The apparatus of claim 18, wherein the means for retaining packets further comprises:
means for discarding a given packet if the new weighted average free queue depth is less than a minimum threshold associated with the class of service to which the packet is assigned.

20. The apparatus of claim 18, wherein the means for retaining packets further comprises:
means for retaining a given packet if the new weighted average free queue depth is greater than a maximum threshold associated with the class of service to which the packet is assigned.

21. A computer-readable media, comprising:
instructions for execution in a processor for the practice of a method, said method having the steps,
receiving packets through one or more input ports and assigning the packets to X*Y classes of service, where * represents multiplication, X represents a number of classes of service and Y represents a number,
retaining packets based on probabilities of discard associated with the X*Y classes of service in a multiple storage location buffer that links available storage locations to a free queue; and
transferring the packets through one or more output ports based on the X classes of service.

22. The computer-readable media of claim 21, wherein the method further comprises the steps of:
associating packets assigned to the X*Y classes of service with the X classes of service; and
assigning to the respective packets one of Y associated levels of priority, each level of priority being associated with a different probability of packet loss.

23. The computer-readable media of claim 22, wherein the method further comprises the steps of:
determining a new weighted average depth for the free queue; and
determining a probability of discard for a given packet if the new weighted average free queue depth falls below a predetermined maximum threshold associated with the class of service to which the packet is assigned.

24. The computer-readable media of claim 23, wherein the method further comprises the step of:

discarding a given packet if the new weighted average free queue depth is less than a minimum threshold associated with the class of service to which the packet is assigned.

25. The computer-readable media of claim 23, wherein the method further comprises the step of:
retaining a given packet if the new weighted average free queue depth is greater than a maximum threshold associated with the class of service to which the packet is assigned.

26. A router for use in routing packets over a network, the router supporting a first number of classes of service, the router comprising:
a port to receive packets, each packet having a field that indicates one of a second number of classes of service, the second number of classes of service greater than the first number of classes of service;
a classifier configured map the one of the second number of classes of service indicated by the field of each packet to one of the first number of classes of service and to a particular loss priority value for the packet; and
a processor configured to discard selected packets in response to the one of the first number of classes of service and the loss priority value for each packet, to thereby approximate the second number of classes of service.

27. The router of claim 26 wherein the router discards selected packets based upon a probability of discard for each packet, and wherein the probability of discard of each packet substantially corresponds to the probability of discard specified by the one of the second number of classes of service indicated by the field of the packet.

28. The router of claim 26 wherein the processor is configured to organize all the packets into a single queue containing packets for all classes of service.

29. The router of claim 28 wherein the processor is configured to determine a weighted average depth of the queue, and is configured to determine a probability of discard of each packet if the weighted average depth of the queue passes a predetermined threshold.

30. The router of claim 29 wherein the probability of discard of each packet is a linear function of queue depth, the linear function having a slope value and an intercept value selected based upon the one of the first number of classes of service and the particular loss priority value of the packet.

31. The router of claim 26 wherein the first number of classes of service equals $2^n$ and the second number of classes of service equals $2^{n+m}$, where n and m are positive integers.

32. A method for routing packets over a network with a router supporting a first number of classes of service, the method comprising the steps of:
receiving packets, each packet having a field that indicates one of a second number of classes of service, the second number of classes of service greater than the first number of classes of service;
mapping the one of the second number of classes of service indicated by the field of each packet to one of the first number of classes of service and to a particular loss priority value for the packet; and
discarding selected packets in response to the one of the first number of classes of service and the loss priority value of each packet, to thereby approximate the second number of classes of service.

33. The method of claim 32 wherein the step of discarding further comprises the step of:
choosing selected packets based upon a probability of discard for each packet, the probability of discard of each packet substantially corresponding to a probability of discard specified by the one of the second number of classes of service indicated by the field of packet.

34. The method of claim 32 further comprising the step of:
organizing the packets into a single queue containing packets for all classes of service.

35. The method of claim 34 wherein the step of discarding further comprising the step of:
determining a weighted average depth of the queue to determine, and if the weighted average depth of the queue passes a predetermined threshold, determining a probably of discard for each packet.

36. The method of claim 35 wherein the probability of discard of each packet is a linear function of queue depth, the linear function having a slope value and an intercept value selected based upon the one of the first number of classes of service and the particular loss priority value of the packet.

37. The method of claim 32 wherein the first number of classes of service equals $2^n$ and the second number of classes of service equals $2^{n+m}$, where n and m are positive integers.

38. A computer readable medium containing executable program instructions for routing packets over a network with a router supporting a first number of classes of service, the executable program instructions comprising program instructions adapted to:
receive packets, each packet having a field that indicates one of a second number of classes of service, the second number of classes of service greater than the first number of classes of service;
map the one of the second number of classes of service indicated by the field of each packet to one of the first number of classes of service and to a particular loss priority value for the packet; and
discard selected packets in response to the one of the first number of classes of service and the particular loss priority value for each packet, to thereby approximate the second number of classes of service.

* * * * *